US 6,563,839 B1

(12) United States Patent
Hallenstal et al.

(10) Patent No.: US 6,563,839 B1
(45) Date of Patent: May 13, 2003

(54) COMMUNICATION SYSTEM HAVING A LIMITED NUMBER OF COMMUNICATION CHANNELS

(75) Inventors: Magnus Hallenstal, Täby (SE); Ulf Thune, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/270,861

(22) Filed: Mar. 17, 1999

(30) Foreign Application Priority Data

| Mar. 18, 1998 | (DE) | ........................ 198 11 825 |
| Mar. 3, 1999 | (WO) | .............................. PCT/EP99/01716 |

(51) Int. Cl.[7] ................................................ H04J 3/16
(52) U.S. Cl. ...................................... 370/437; 370/442
(58) Field of Search ................................ 370/321, 336, 370/347, 442, 437

(56) References Cited

U.S. PATENT DOCUMENTS

| 4,970,723 | A | | 11/1990 | Lin ........................ 370/110.1 |
| 5,317,415 | A | | 5/1994 | Kinami et al. .............. 358/425 |
| 5,475,691 | A | | 12/1995 | Chapman et al. ......... 370/110.4 |
| 5,513,379 | A | * | 4/1996 | Benveniste et al. ......... 455/33.1 |
| 5,581,560 | A | | 12/1996 | Shimada et al. ............. 370/527 |
| 5,729,534 | A | * | 3/1998 | Jokinen et al. .............. 370/280 |
| 5,748,624 | A | * | 5/1998 | Kondo ........................ 370/347 |
| 6,047,006 | A | | 4/2000 | Brakefield et al. .......... 370/524 |
| 6,047,189 | A | * | 4/2000 | Yun et al. .................... 455/452 |
| 6,351,461 | B1 | * | 2/2002 | Sakoda et al. .............. 370/335 |

FOREIGN PATENT DOCUMENTS

| AU | A-75101/98 | 1/1999 |
| CA | 2240772 | 1/1999 |
| DE | 198 20 382 A1 | 11/1998 |
| EP | 0 892 581 A2 | 1/1999 |
| FR | 2 773 431 A1 | 7/1999 |
| WO | WO 93/23809 | 11/1993 |
| WO | WO 99/35877 | 7/1999 |
| WO | PCT/EP 99/01716 | 8/1999 |

OTHER PUBLICATIONS

*Integrated Services Digital Network (ISDN); Call Waiting (CW) Supplementary Service; Service Description*, European Telecommunications Standards Institute (ETSI), ETS 300 056 A1, Sep. 1996; Reference: RE/NA–010047; pp. 1–5.
*Integrated Services Digital Network (ISDN); Call Waiting (CW) Supplementary Service; Digital Subscriber Signalling System No. One (DSS1) Protocol; Part 1: Protocol Specification*, European Telecommunications Standards Institute (ETSI), ETS 300 058–1, Oct. 1991; Reference: T/S 46–33F; pp. 1–19.
*An Evaluation of ISDN via ACTS in Support of Army Wide Area Information Services* by LTC Joseph M. Hanratty, Ph.D., J.W. Gowens, Ph.D., Jeffery Evans and Brian Rivera; vol. 3, No. Conf. 12, Oct. 11–14, 1993, pp. 988–992; XP000410900.
*The Integrated Services Digital Network (ISDN) As a Basis for Combined Telecommunication* by Peter R. Gerke; Electronics to Microelectronics (Eurocon), 4th Conference; Mar. 24–28, 1980, pp. 233–236; XP002037606.

* cited by examiner

*Primary Examiner*—Kenneth N Vanderpuye
(74) *Attorney, Agent, or Firm*—Jenkens & Gilchrist, P.C.

(57) ABSTRACT

Method of controlling communication links in a communication system, each communication link occupying at least one of a limited number of communication channels and being used for communications between communication devices. The invention allows a requested first communication link to be established, even if a free communication channel is not available. Control means are provided to determine at least one second communication link which uses at least two communication channels and to initiate a release procedure for at least one of the communication channels of the identified communication link. The released communication channel is used to establish the requested first communication link. After termination of the requested and established link, the communication channel may be returned to restore the at least one second communication link. The invention can equally be applied to ISDN-systems as well as to mobile communication networks.

18 Claims, 6 Drawing Sheets

COMMUNICATION SYSTEM HAVING A LIMITED NUMBER OF COMMUNICATION CHANNELS

FIELD OF INVENTION

The present invention relates to a system and a method of controlling a communication system, and in particular, the present invention relates to controlling communication links in a communication system having a limited number of communication channels, wherein each communication link occupies at least one communication channel.

BACKGROUND OF THE INVENTION

In today's computerized world, telecommunication networks are increasingly used to transmit data between computers. Telecommunication networks, however, have been designed mainly for the transmission of speech signals and therefore are not well equipped for the transmission of digital data at high data rates. Furthermore, subscribers of telephone networks increasingly demand simultaneous use of both, a computer in a data transmission session and a telephone in a telephone call.

One solution to this problem is to link the subscriber, e.g. his household or his workplace with multiple telephone lines which can be used for data or speech transmission at his discretion.

Integrated Services Digital Network ISDN has been developed to provide a subscriber with multiple lines for independent use. If a user has subscribed to ISDN services, he will have two digital telephone lines with each 56–64 kbit/s for the transmission of speech signals or the transmission of data. The ISDN subscriber could now connect his computer to one of the two so-called B-channels of the ISDN system. Via this first B-channel the ISDN subscriber could, e.g. connect to an Internet access point while he would still have the second B-channel available for making phone calls or being called by an outside subscriber. Further, ISDN provides a so-called D-channel. The D-channel is a general packet data channel. In general, the D-channel may be used for both signaling between a user terminal and the ISDN Local Exchange and user voice/data transmission.

With the demand for ever higher rates of data transmission, in many cases the ISDN subscriber will want to use both B-channels of the ISDN service for a data transmission session between his computer and, for example, an Internet Access Server. Data communication protocols are available, e.g., multi-link PPP, which provide the option to connect and exchange data via multiple individual lines or communication channels.

Consequently, if the ISDN subscriber uses both B-channels of the ISDN service for a data transmission session, there is no line available for receiving an outside call or for making a call towards the outside. A user calling from the outside would receive a busy signal, since no B-channels are available, and the ISDN subscriber connected with his computer will also not have a free channel for making a call to the outside.

Therefore, a problem arises when the ISDN subscriber has connected himself to, e.g., an IAS (Internet Access Server) via both of his only two B-channels of his ISDN service. If the subscriber now suddenly gets a phone call via a telecommunications network, the calling subscriber will experience a busy signal. And most likely the ISDN subscriber wants to avoid this situation. He would like to use both lines for the data transmission session, but he also would like to be reachable by telephone.

In ISDN applications, it is basically possible to use the D-channel for a transmission of user data, for a telephone call or a data transmission session. The basic problem, however, remains the same, i.e., at one point all available channels may be occupied.

To solve this problem, "Call Waiting" a so called feature has been proposed in the "European Telecommunication Standard ETS 300058-1", October 1991 from the European Telecommunication Standards Institute. This "Call Waiting" service allows the user to send a SETUP request as part of the ISDN protocol via the D-channel even through both B-channels of the ISDN system are occupied. This SETUP request allows a terminal to pick up the call, however, only a terminal using a B-channel at this point in time are allowed to do so. This means that in the above case with a computer connected in a data transmission session via both B-channels, only the computer is allowed to pick up the call.

This is not only inconvenient, since only the computer may be used for a telephone call, it also implies that the computer must be equipped with a microphone and speaker and be compatible with the speech bearer service.

It is obviously desired, that the call may be picked up by any telephone terminal, e.g., by a telephone set next to the computer or in a different room. This, however, is not possible with the above ISDN "Call Waiting" service, since a B-channel is not available for the telephone terminals (both B-channels are occupied by the data transmission session).

Further, it is disadvantageous, that the "Call Waiting" feature does not help when the ISDN subscriber involved in a data transmission session occupying two B-channels (a 2B-channel session) wants to make an outgoing telephone call. In order to make a telephone call, the user has to disconnect at least one of his ISDN B-channels involved in the data transmission session.

Moreover, the "Call Waiting" feature might also disturb the data transmission session, e.g., the multi-link PPP-session, if one of the PPP-connections is suddenly put on HOLD.

SUMMARY OF THE INVENTION

In view of the above problems it is an object of the invention to provide a system and method for flexibly assigning communication channels to communication links.

This object of the invention is solved by a method of controlling communication links in a communication system, each communication link occupying at least one communication channel and being used for communications between at least two communication devices, comprising: detecting a request for a first communication link; establishing the requested communication link if free communication channels are available; and if free communication channels are not available, detecting at least one second communication link occupying at least two communication channels; releasing at least one of the communication channels of the at least one second communication link; and establishing the first communication link using the at least one released communication channel.

This object of the invention is further solved by a method of controlling communication links in a communication system, each communication link occupying at least one communication channel and being used for communications between at least two communication devices, comprising:

detecting a request for a first communication link; establishing the requested communication link if free communication channels are available; and if free communication channels are not available, detecting at least one second communication link occupying at least two communication channels; sending a disconnect command from a control means to the corresponding communication devices; releasing at least one of the communication channels of the at least one second communication link; receiving a release message from the communication devices; sending a release complete message from the control means to the corresponding communication devices; and establishing the first communication link using the at least one released communication channel.

Further, the object of the invention is solved by a communication system, comprising: a plurality of communication devices; a plurality of communication links for communications between the plurality of communication devices, each communication link occupying at least one communication channel; control means including: first detection means for receiving a request for a first communication link and for receiving a termination message in case a communication link is terminated; second detection means for determining at least one second communication link occupying at least two communication channels, in case a free communication channel is not available; and switching means for controlling the release of at least one communication channel of the at least one second communication link, and establishing the first communication link via the released communication channel.

The invention allows a user to establish a communication link, even if a free communication channel is not available, by detecting at least one second communication link occupying at least two communication channels, releasing at least one of the communication channels of the at least one second communication link and establishing the requested first communication link using the at least one released communication channel.

Subsequently, in case a communication channel becomes available thereafter, the second communication link may be restored to its original state by resuming communication via this or these communication channels.

Advantageously, in case the first communication link is terminated, its at least one communication channel may be released and the at least one second communication link may resume communication via the released channels of the first communication link.

Also, in case the first communication link is terminated, the devices communicating via the at least one second communication link may be notified by control means and instructed to resume use of the at least one released communication channel of the first communication link.

Further, it is possible that at least one of the devices communicating via the at least one second communication link performs regular check-ups of the state of the communication channels and resumes use of a released channel, in order to restore the corresponding communication link to its original state, that is, to the state before at least one of its communication channels has been released.

Advantageously, in order to avoid an erroneous release of communication channels of a communication link using at least two communication channels, a service record may be checked and it may be determined whether the target communication link is marked available for releasing at least one of its communication channels.

The invention may advantageously be also applied to systems employing ISDN (Integrated Services Digital Network), e.g., in case data processing units are involved in a data transmission session and conduct a multi-link PPP-session via the two ISDN-B-channels, and an outgoing or an incoming telephone call occurs.

The invention may also be applied to mobile communication networks, in which case the communication devices include mobile communication units of the mobile communication network.

Further advantageous embodiments of the invention are disclosed in further dependent claims.

BRIEF DESCRIPTION OF THE DRAWINGS

The invention may be better understood when read in conjunction with the accompanying drawings.

DETAILED DESCRIPTION OF EMBODIMENTS

In the following, preferred embodiments of the invention are described with respect to the figures.

Figure 1:
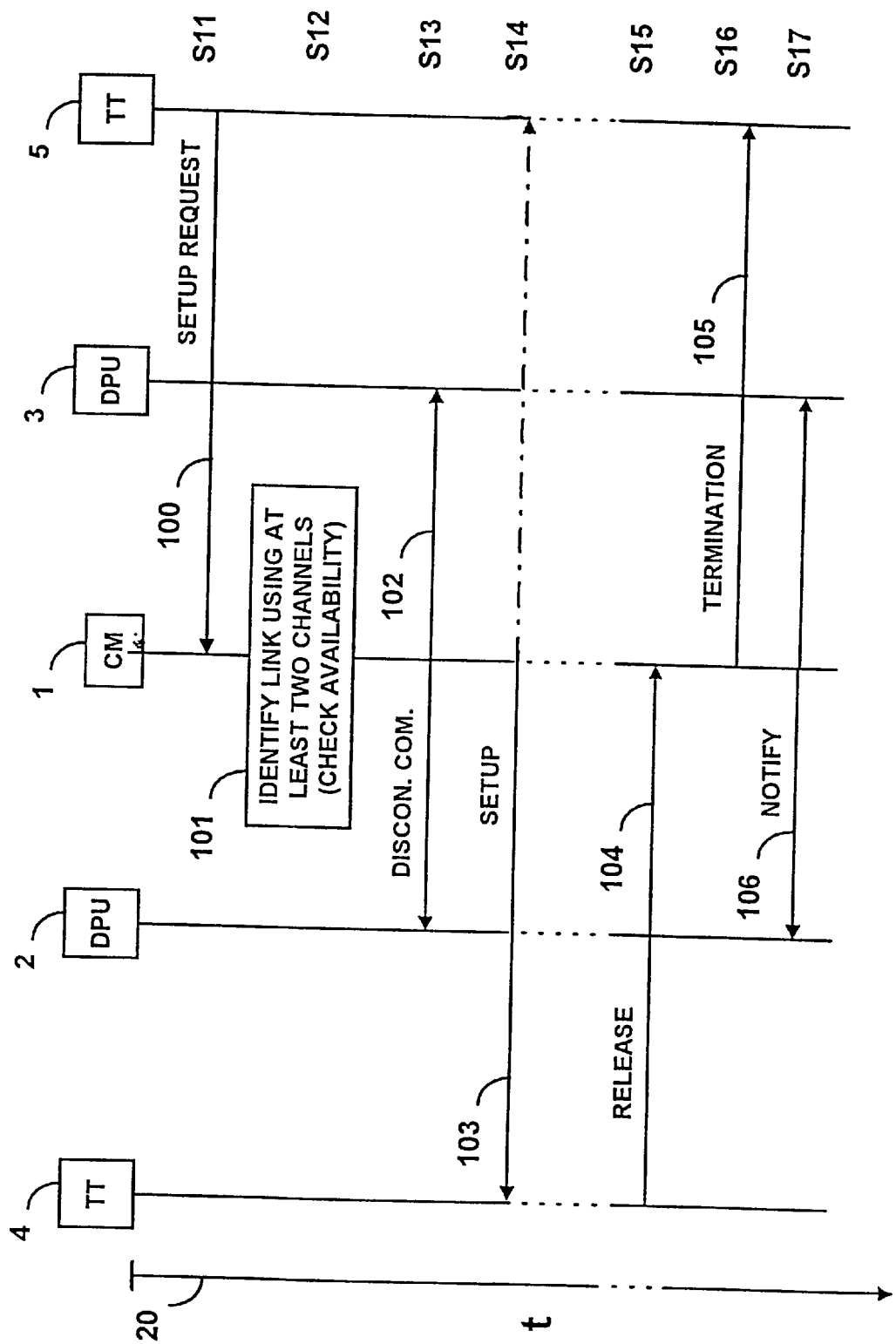
FIG. 1 illustrates in a time/flow diagram an embodiment of the method according to the invention.

FIG. 1 shows a time/flow diagram illustrating an example of the method according to the invention. Part of a communication system including control means 1 (CM), two data processing units 2, 3 (DPU) and two telephone terminals 4 and 5 (TT) are illustrated. Even if not shown, the communication system may include further communication devices.

The control means 1 controls communications between the communication devices. It establishes communication links between two devices or groups of devices. A communication link is the medium employed by communication devices for communications. A communication link therefore carries information concerning a single communication process, e.g., speech signals between at least two telephone terminals or data exchanged between at least two data processing units. A communication link supports communications between at least two communication devices.

Communication links occupy at least one communication channel, e.g., a communication link between two telephone terminals may occupy one channel, a communication link between data processing units may occupy two communication channels or an even larger number of channels. A communication link can usually be established using a single communication channel, even though higher data rates can be achieved by using a plurality of communication channels for a communication link.

A communication channel can be a physical line, for example a telephone line, or it can be a virtual line, e.g. a fixed time slot on a multiplexed connection.

The control means 1 is responsible for controlling communications between communication devices. In particular, the control means is responsible for controlling the use of communication channels by communication links.

In the example of FIG. 1, it is assumed that the two data processing units 2, 3 communicate using a communication link which occupies at least two communication channels. Further, it is assumed that a user of telephone terminal 5 makes a phone call to reach a user at telephone terminal 4, i.e., dials the telephone number of telephone terminal 4. Thus, a communication link between the telephone terminals is requested by telephone terminal 5.

In case, a free communication channel of the communication system is available, the requested communication link can readily be established in a conventional manner. However, in case all communication channels are occupied, the requested communication link cannot directly be setup.

In the following it is outlined with respect to FIG. 1, how, according to the present invention the requested communication link may still be established in the above case.

Generally speaking, this can be achieved by "borrowing" a communication channel from another communication link. In the present case it is assumed that a communication channel from the communication link between the two data processing units 2 and 3 will be borrowed.

It is further outlined with respect to FIG. 1, after the requested communication link or any other communication link has been terminated, how the communication link between the data processing units 2 and 3 can be restored to its original state, i.e., to the state before a communication channel was borrowed.

On the right side of FIG. 1, steps S11–S14 are indicated, which steps are involved in the procedure to establish the requested communication link between the two telephone terminals 4 and 5. This is the call setup procedure.

Further, steps S15–S17 of a call release and resume procedure are indicated, which steps concern the release of the communication channel after the termination of the requested communication link, and resuming the use of the released communication channel for the communication link between the data processing units 2 and 3.

On the left side of FIG. 1, the arrow 20 denoted with the parameter t indicates time during the call set-up procedure and the call release and resume procedures.

First, the call set-up procedure is outlined in detail.

In step S11 a request for a communication link between telephone terminals 4 and 5 is issued by the telephone terminal 5, as indicated with an arrow 100. This request for a communication link, the setup request, is detected by the control means 1.

Following, in step S12, the control means 1 determines, whether a free communication channel is available to set up the requested communication link. It is understood that in case a communication channel were available, a communication link between the telephone terminals 4 and 5 may be established in a known manner. In the example of the present embodiment, however, it is assumed that a free communication channel is not available. Therefore, as indicated by a reference sign 101, the control means 1 performs a detection procedure to identify a communication link occupying at least two communication channels. In the present example, it assumed that the control means detects the communication link between the two data processing units 2 and 3 which, as mentioned above, occupy at least two communication channels.

In the following, in a step S13, a release or disconnection of one of the communication channels of the identified or target communication link, i.e., the communication link between the two data processing units 2 and 3, is initiated. A disconnect command, as indicated at a reference sign 102, is sent from the control means 1 to one or both data processing units 2 and 3, which in response thereto release one of the communication channels of the communication link used for the data transmission session. Note that the data transmission session is still conducted using the remaining communication channel or channels.

Following, in a step S14, the control means 1 initiates establishing the requested communication link between telephone terminals 4 and 5. This involves sending a setup message, as indicated using a reference sign 103, from the control means 1 to the telephone terminal 4. The communication link may now be established in a known manner.

It is noted, that the data transmission session via the communication link between the two data processing units 2 and 3 is still in progress, however, at a reduced data transmission rate, while the requested telephone communication link has now been established between the two telephone terminals 4 and 5.

In the example of FIG. 1 it is assumed that a communication link between two telephone terminals requiring a single communication channel is requested and established. However, in other examples, more than one communication channel could be requested, for example by further communication devices, e.g. for a data communication or video transmission.

In this case, in step S12, the control means could try to identify a single communication link using a sufficiently large number of communication channels and request the release of a plurality of communication channels in the disconnect command of step S13.

Further, in this case, the control means 1 could try to identify a plurality of communication links using at least two communication channels and request the release of at least one communication channel each. Thus, in step S13 several disconnect procedures, could be included and, accordingly, step S14 would include several setup procedures for establishing the requested communication link.

Further channel request scenarios are possible, e.g., a plurality of requests for establishing communication links, resulting in a plurality channel release procedures.

Step S12, in further examples, may also include a look-up procedure in a service record storing information about individual communication links in order to verify that the identified communication link or links using at least two communication channels are marked available for releasing communication channels. Also, a determination step could be included to determine how many communication channels of the targeted communication link or links are available for release.

Also, the selection of a target communication link for a release of communication channels may follow priority considerations, i.e., the determination step could include determining a priority of a communication channel, according to which the control means 1 decides to initiate a release of a channel or not.

In the following the call release and resume procedure of the steps S15–S17 is described in detail.

At a certain time instant the telephone conversation via the communication link between telephone terminals 4 and 5 is terminated, e.g., by hanging up the handle of telephone terminal 4. Accordingly, in a step S16 a release message, as indicated with a reference sign 104, is issued by telephone terminal 4 and received by the control means 1. Of course, in further cases, the released message could have been issued by telephone terminal 5 as well.

In a step S16, in response to the release message of step S15, the control means 1 may send a termination message, as indicated with a reference sign 105, to telephone terminal 5.

Following, in a step S17, the control means 1 may send a notification message, as indicated with a reference sign 106, to the data processing units 2 and 3, or one of them, that the borrowed communication channel is available again.

Subsequently, the communication link between the data processing units 2 and 3 can be restored to its original state, i.e., the state before a communication channel was borrowed, by resuming use of the released communication channel of the terminated telephone conversation. Of course, a communication link may also be only partially restored to its original state, according to availability of released communication channels.

It is noted that, in case the communication system includes more communication devices than shown in FIG. 1, not necessarily the specific communication channel of the requested and established telephone link must be used, any other released communication channel could be used instead, to restore the communication link between the data processing units 2 and 3 to its original state.

It is also possible that the data processing units 2 and 3 are not notified by control means 1 in step S16, but poll the status of the communication channels from time to time in order to detect a released communication channel using poll means 504 (P). This may be a specific communication channel or an arbitrary one, as outlined above. In case a released communication channel is detected, the data processing units could restore their communication link to its original state by using the detected free communication channel.

In case the requested communication link between telephone terminals 4 and 5 occupied more than one communication channel and/or the communication link between the data processing units 2 and 3 occupied more than two communication channels, the call release and resume procedure of the steps S15–S17 may involve a plurality of channel release and resume steps, until the communication links between data processing units 2 and 3 and possibly between further communication devices are restored to their original state.

The invention is not limited to communication links established or requested between two parties, e.g., besides the data processing units 2 and 3 a larger number of communication devices could be engaged in a group call and further telephone terminals may be involved in the requested communication link, which, in the example of FIG. 1, is to be established between telephone terminals 4 and 5.

In the embodiment of FIG. 1, telephone terminals 4 and 5 and data communication devices 2 and 3 are used, however, only by way of an example for illustrating the invention. In further embodiments, instead of the data processing units 2, 3 and the telephone terminals 4, 5, any communication devices could equally well be used. For example, data processing devices may request a communication link instead of the telephone terminals 4 and 5.

Figure 2:
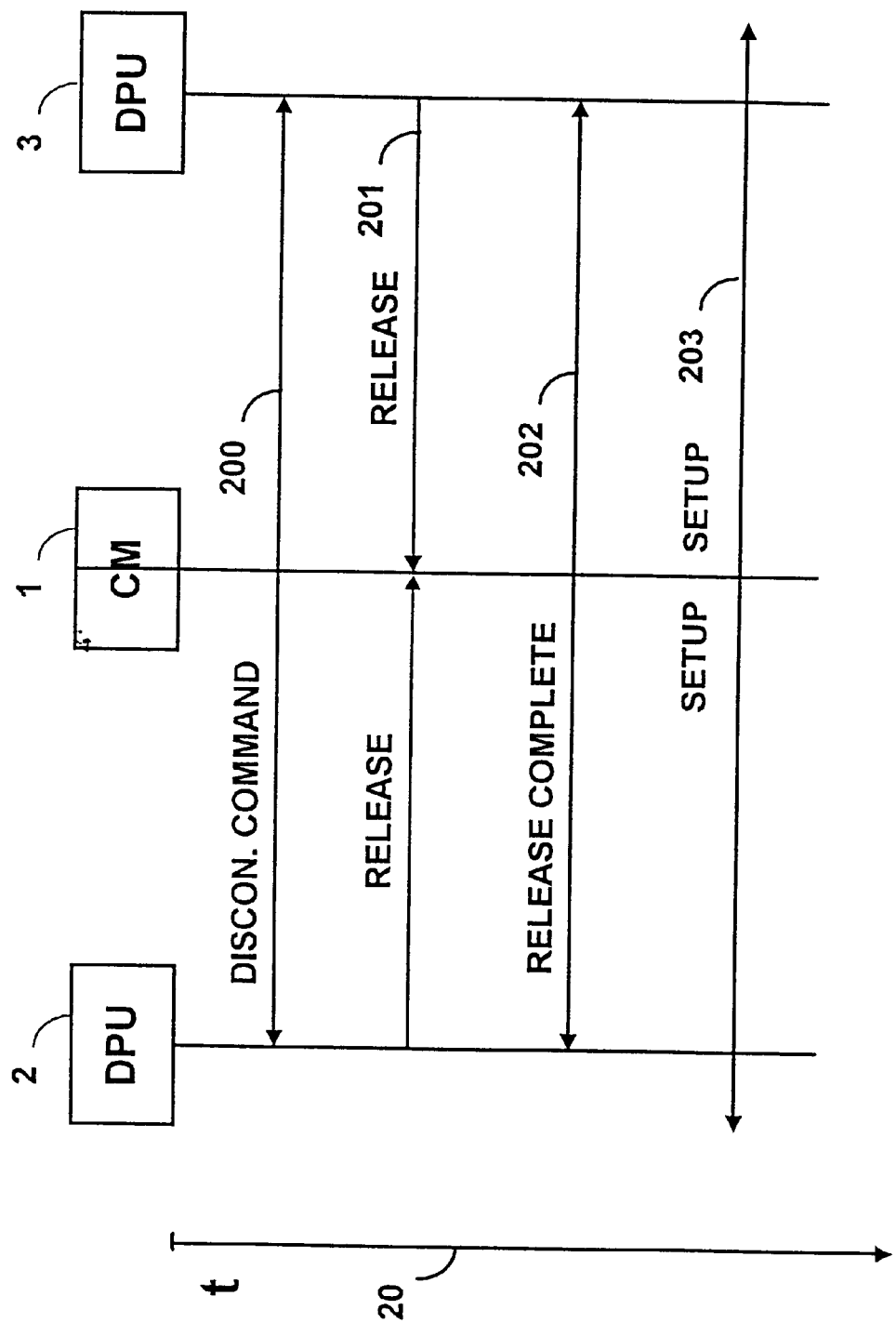
FIG. 2 shows a time/flow diagram of part of an embodiment of the method according to the invention.

FIG. 2 illustrates an example of part of the method according to the invention, as outlined with respect to FIG. 1.

FIG. 2 illustrates an example of a procedure for releasing a communication channel of a communication link occupying more than one communication channel, e.g., as outlined with respect to step S13 in FIG. 1.

FIG. 2 shows part of a communication network including two data processing units 2 and 3 and control means 1. The data processing units may, e.g., be involved in a data transmission session using a multi-link PPP-protocol. The arrow, as indicated with a reference sign 20, indicates time during the disconnect procedure. In the example of FIG. 2, it is assumed that the control means 1 has already received a request for a communication link and has identified the communication link between data processing units 2 and 3 as occupying a plurality of communication links.

The control means 1 issues a disconnect command, as indicated with a reference sign 200, to one or both of the data processing units 2 and 3, requesting the disconnection of a specified number of communication channels. In response to the disconnect command form the control means 1, the data processing units 2 and 3 initiate the release of the requested number of communication channels. This may involve steps for terminating a transmission of data via these communication channels, in order to avoid any data loss due to an unexpectedly interrupted communication channel.

Thereafter, the communication devices 2 and 3 will reply with a release message, as indicated with a reference sign 201, indicating that the release of the requested communication channels may now be performed. Subsequently, the control means will terminate communications via the specified communication channels and may issue a release complete message, as indicated with a reference sign 202, which is sent to the communication devices 2 and 3.

Thereafter, the released communication channels are available for establishing the requested communication link in a call SETUP, as indicated with a reference sign 203.

Figure 3:
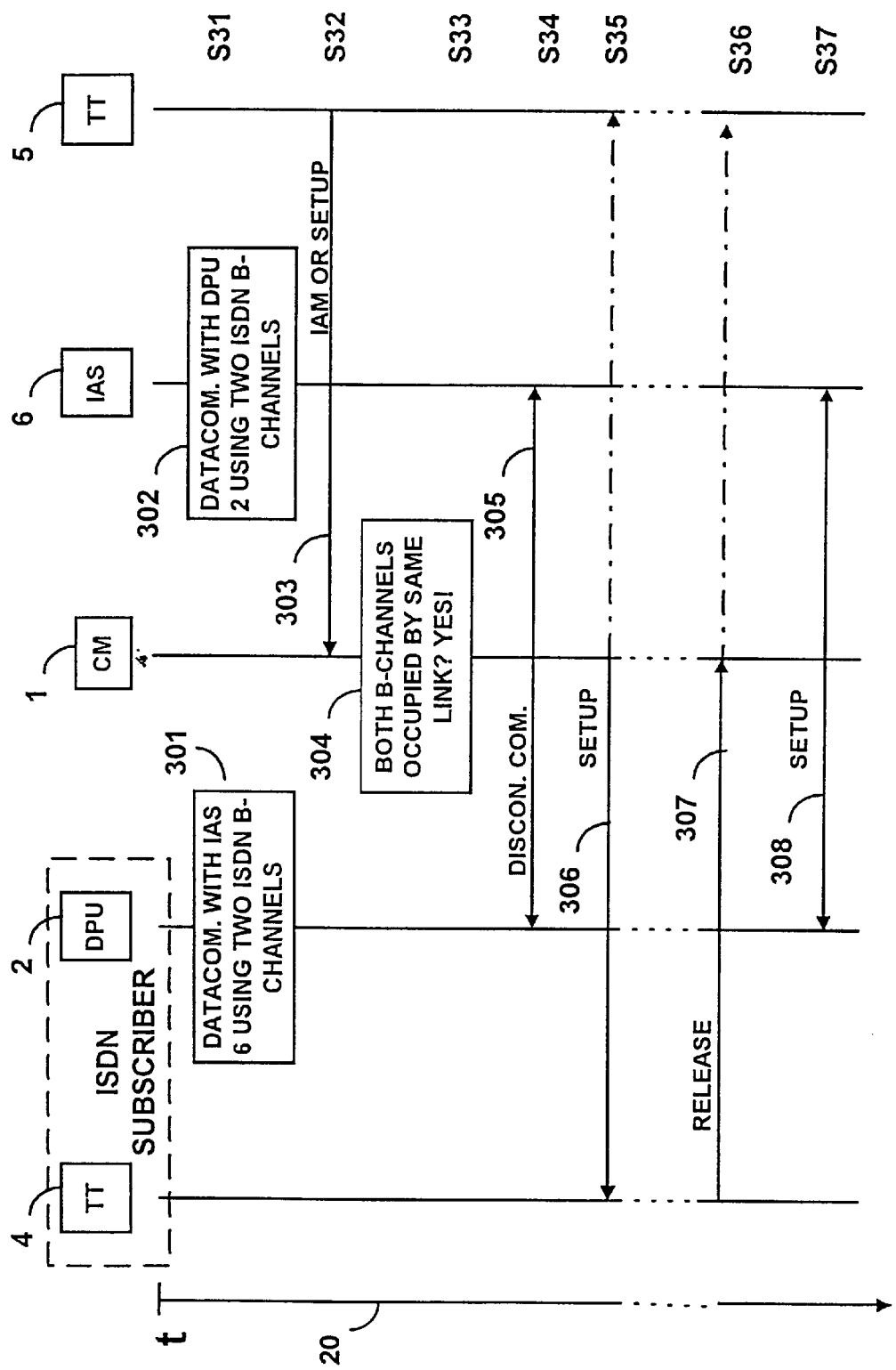
FIG. 3 shows time/flow diagram of another embodiment of the invention, applied to an ISDN (Integrated Services Digital Network) system.

FIG. 3 shows an embodiment of the method according to the present invention applied to an ISDN-system. ISDN (Integrated Digital Services Network) is a digital system for a simultaneous transmission of a voice and data. The features of ISDN were further outlined in the introductory section. ISDN provides two B-channels or bearer channels at, e.g., 64 kbit/s each. Further, ISDN provides a D-channel or data channel, for data or signaling control information. Thus, ISDN can be considered providing 2 B+D channels. The two B-channels can be used by a subscriber for transmitting speech signals or data. In the present example it is assumed that the D-channel is not available to the subscriber for speech or data transmission.

ISDN is increasingly used in private environments, by subscribers wishing to be connected by two communication channels (the two B-channels). The subscriber can individually use the two communication channels at his own discretion, i.e., he may use each for data or speech transmission. However, as outlined in the introductory section, for achieving high data rates, the subscriber may also connect both communication channels in a data transmission session, for example, with an Internet provider. In this case the subscriber can not readily make a phone-call nor can he be readily reached by a telephone-call from the outside, as stated above.

In FIG. 3, as in previous examples, control means 1, a data processing unit 2, and two telephone terminals 4 and 5 are illustrated. Further, a data processing unit 6 is shown. This data processing unit may be, e.g, an Access Server IAS, for connecting to a computer network.

As indicated by reference signs 301 and 302, the two data processing units 2, 6 are involved in a 2 B-channel data transmission session. The data processing units are thus occupying both communication channels available to the ISDN subscriber. In the above example the first data processing unit 2 may, e.g., be a data processing unit operated by the ISDN-subscriber, the second data processing unit 6 may for example be another computer or an Internet access server for accessing the world-wide web. The two data processing units 2 and 6 may, for example, conduct a communication using a multi-link PPP-protocol. However, this is an example only, and the data processing units may use any other protocol. The important fact is that they occupy both B-channels for exchanging information via the communication link established between each other.

Further, it is assumed that the ISDN subscriber has access to telephone terminal 4. Thus the ISDN subscriber operates both, the telephone terminal 4 and data processing unit 2.

It is now assumed, that someone from the outside, via a telephone terminal 5, tries to reach the ISDN-subscriber at his telephone terminal 4. Therefore, in a step S32, the telephone terminal 5 will issue a communication link request, as indicated with a reference sign 303, which is received by control means 1. The control means 1 in the present example may be the local exchange of the ISDN-network. This request for a communication link therefore may be an Initial Address Message IAM or a SETUP message. The request message may be transmitted via a public telephone network or any other communication network.

After receiving the request for a communication link, in a step S33, and indicated with a reference sign 304, the control means 1 checks, whether the 2 B-channels towards the ISDN-subscriber are both occupied. This will be true, since the data processing unit 2 of the ISDN-subscriber is involved in a data transmission session within data processing unit 6 using the 2 B-channels, as it was outlined above with respect to reference signs 301 and 302.

Step S33 may also involve checking a service record for determining whether one of the B-channels is available for release. It is noted, that both B-channels have to be occupied by the same communication link. In case they are not occupied by the same communication link, the calling subscriber may receive a busy signal or a "Call Waiting" feature may be involved.

Since both B-channels are involved in the data transmission session between the data processing units 2 and 6, in a step S34, a disconnect command, as indicated with a reference sign 305, will be issued by the control means 1 and forwarded to the data processing units 2 and 6. In response to the disconnect command issued to the two data processing units 2, 6, one of the two B-channels is released and made available for establishing the requested communication link between the two telephone terminals 4 and 5.

Subsequently, in a step S35, a connection setup message, as indicated with a reference sign 306, is issued by the control means 1 towards the telephone terminal 4 of the ISDN-subscriber and the requested communication link is established.

It is noted that the invention also allows that a call is being made from the telephone terminal 4 of the ISDN-subscriber, in which case in step S32 the request for a communication link is not issued by telephone terminal 5 but issued by the telephone terminal 4 of the ISDN-subscriber and the request could be transmitted via the D-channel to the control means, e.g., the local exchange. The setup message of step S35 would be issued towards the called telephone terminal, in this case telephone terminal 5.

After these steps, the data transmission session between data processing units 2 and 6 is still in progress, however, at a reduced data rate, while the requested telephone conversation has been established.

If now either one of the parties engaged in the telephone conversation hangs up his hand-set, a release message, as indicated with a reference sign 307, will be transmitted to the control means 1. In the present example, it is assumed that the hand-set of telephone terminal 4 is hung up. Therefore, in a step S36, a release message is issued by telephone terminal 4. The release message may also be forwarded to the telephone terminal 5. Subsequently, the communication channel between the two telephone terminals will be released and thus again be available for use by the data transmission session between the data processing units 2 and 6.

Therefore, in a step S37 the control means will issue a setup message, as indicated with a reference sign 308, towards one or both of the data processing units 2 and 6 which in the following, will restore the data transmission session via the two B-channels.

In other embodiments, alternatively to step S37, one or both data processing units 2, 6 may, in regular intervals, check the status of the B-channels, and, in case the second B-channel becomes available after termination of the telephone conversation between the telephone terminals 4 and 5, may regain use of the second B-channel. In this case a setup message from the control means 1 is not required.

In case the communication link for the telephone conversation is requested by the telephone terminal 4 of the ISDN-subscriber, the request for a communication link may be transmitted via the D-channel of the ISDN-system towards the local exchange. The local exchange may then check whether both B-channels are being used in the same communication link, and, in case this is true, the released procedure of one of the B-channels may be initiated.

As stated above, the invention may also be applied to communication networks, and in particular, to mobile communication networks, e.g. to networks according to the GSM-standard.

Figure 4:
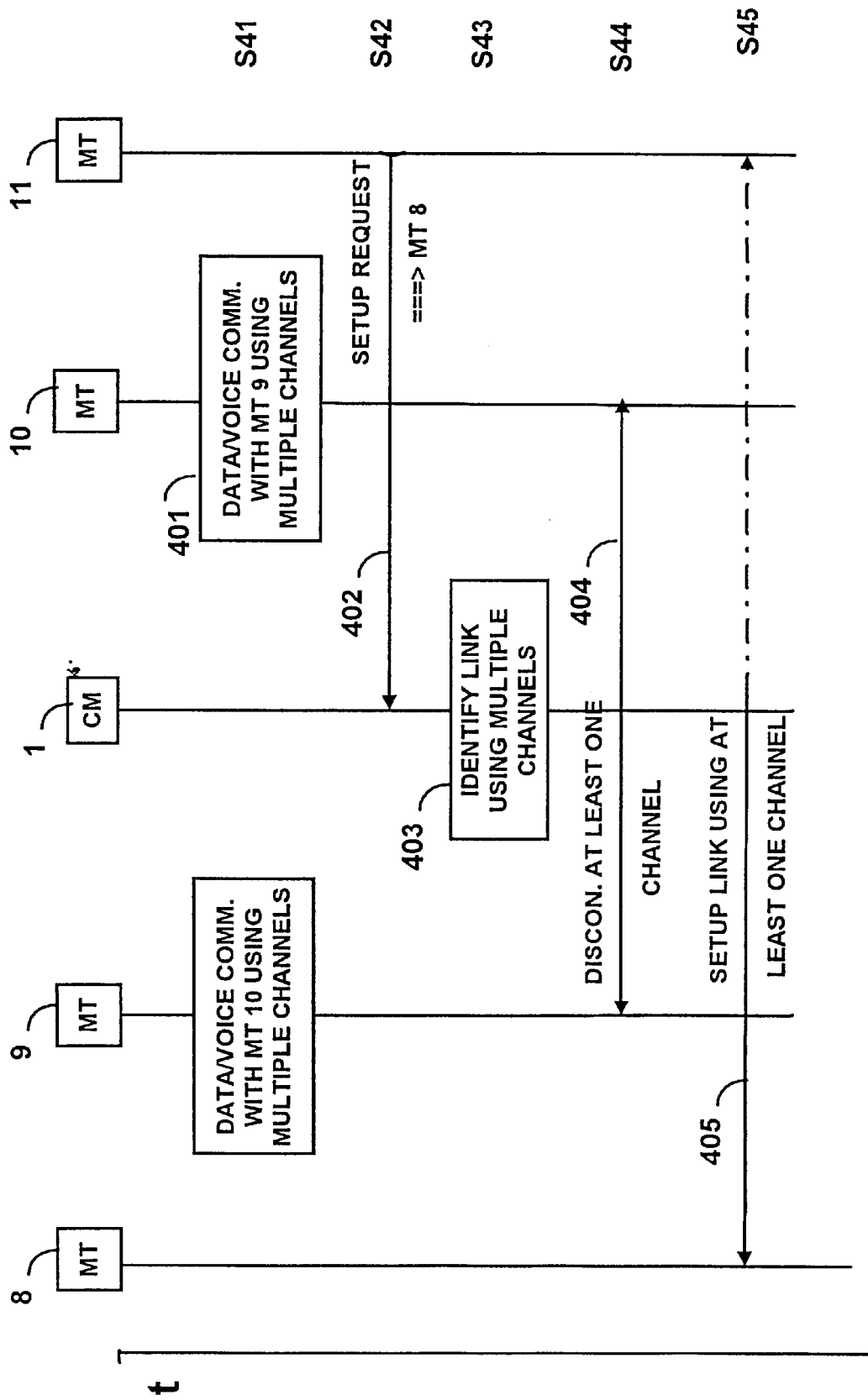
FIG. 4 shows a time/flow diagram of another embodiment of the invention, applied to a mobile communication network.

FIG. 4 shows another embodiment of the invention, applied to a telecommunications network.

In mobile communication networks, a communication channel may be a time slot on a multiplexed transmission medium, e.g. a frequency band. A base station is responsible for establishing communication links with a plurality of mobile units, by way of assigning a particular time slot on the transmission medium to one particular mobile station. Usually, a particular time slot on the transmission medium is associated with a particular communication channel.

A communication link between a mobile station and the base station may use at least one communication channel, i.e., at least one particular time slot. A particular communication channel in a mobile communications network has a specific bandwidth. If now a communication link with a larger capacity is required, for example, a larger number of communication channels (time slots) may be assigned to a particular communication link between the base station and the corresponding mobile station, e.g., up to eight channels.

FIG. 4 illustrates four mobile communication units (MT) 8, 9, 10 and 11. The mobile communication units may be mobile telephones or data processing units, cameras, etc., linked to a mobile terminal. Again, control means 1 is provided for controlling the assignment of communication channels to communication links. Further communication devices of the mobile communication network are not shown.

It is assumed, that the second and third mobile communication units 9 and 10 are involved in communications, as indicated by reference signs 400 and 401. In the example of FIG. 4, it is assumed that the mobile communication unit 9 and the mobile communication unit 10 are involved in a data and/or voice communication using multiple communication channels.

It is further assumed that the fourth mobile communication unit 11, in a step S42, issues a request for a communication link with the first mobile communication unit 8, as indicated by a reference sign 402. And, as above, it is assumed that free communication channels for establishing the requested communication link are not available.

Therefore, in a step S43 the control means 1, after receiving the request for the communication link from unit mobile communication unit 11, checks all other communication links, in order to determine a communication link using multiple channels, as indicated by a reference sign 403. In the present embodiment, for explanatory purposes, it is assumed that the communication link between the second and the third mobile communication unit 9 and 10 is identified as using a plurality of communication channels.

It is noted that in other examples a plurality of communication links occupying at least two communication channels may be identified, for example, if the requested communication link requires a plurality of communication channels. Also, as in previous examples, a service record may be checked beforehand, in order to determine, whether the indentified communication links are marked available for releasing at least one of their communication channels.

Subsequently, in a step S44 the control means 1 issues a disconnect command, as indicated by a reference sign 404, for disconnecting at least one communication channel, towards the second mobile communication unit 9 and/or third mobile communication unit 10.

This disconnect message issued by the control means 1 may, in other examples, also be sent to further communication devices involved in communication links targeted for the release of communication channels. Further, a request for release of communication channels according to characteristics of the involved communication links may be considered. For example, the request may depend on the number of communication channels requested by the fourth mobile communication unit 11, on the number of communication channels occupied by the targeted communication links and may depend on priority considerations.

Thus, the control means 1 may flexibly determine a multiple number of communication links using at least two communication channels, and issue disconnect commands to a plurality of mobile communication units.

In the present example, in a step S45, the control means 1 issues a setup message, as indicated by a reference sign 405, to the first mobile communication unit 8, allowing the first and the fourth mobile communication unit 8 and 11 to use the released communication channels for the requested communication link. The requested communication link can now be established in a known manner.

The release and resume procedures, if one communication link is terminated, may in general correspond to the released and resume procedures outlined with respect to the steps S15–S17 of FIG. 1.

A communication channel, which becomes available due to a termination of a communication link, may be assigned to any communication link, preferably however, to communication links which were instructed to release at least one of their communication channels. Thus, communication channels may dynamically be assigned to communication links according to availability, demand and priority considerations.

In the following, with respect to FIG. 5, an embodiment of the communication system according to the invention is described.

Figure 5:
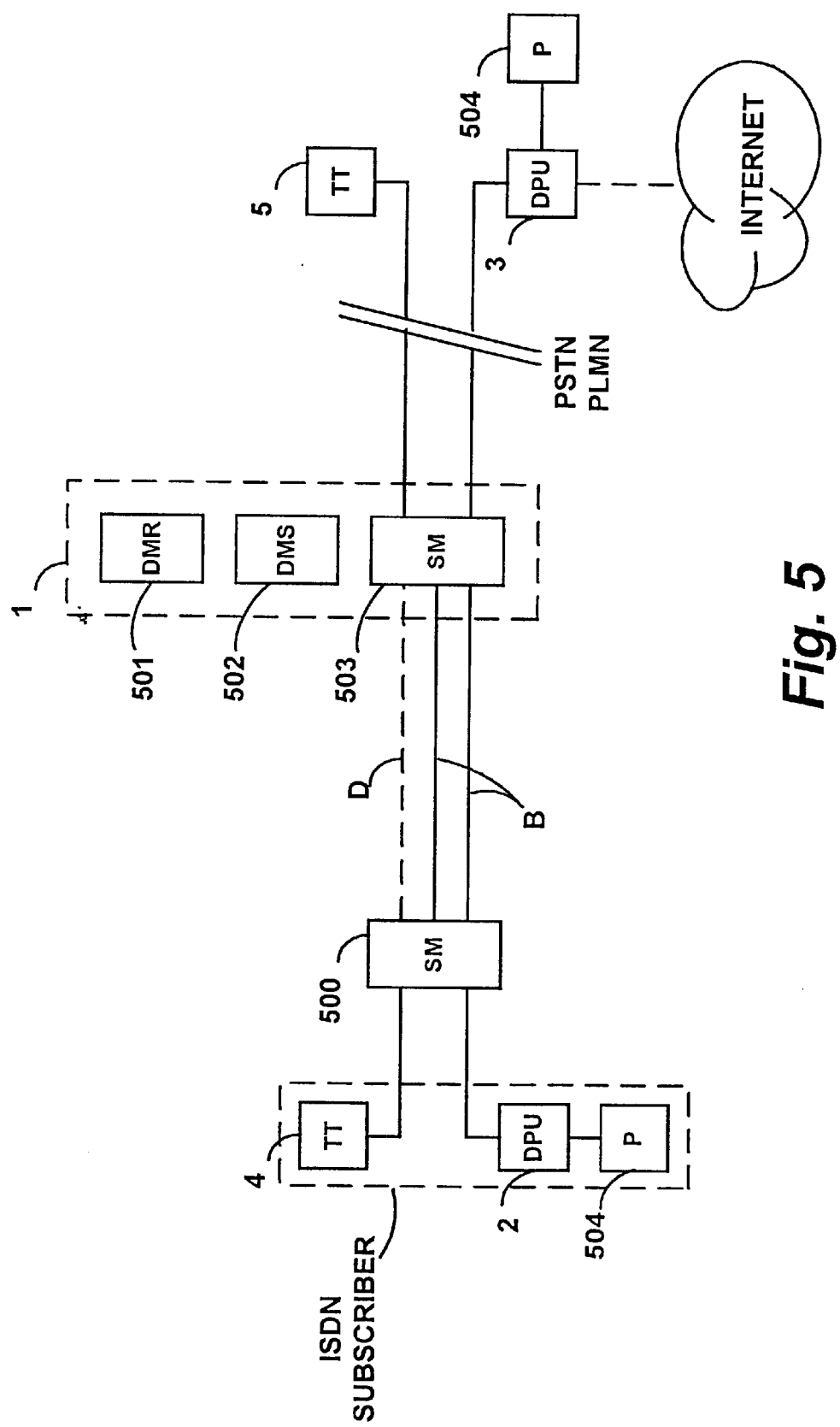
FIG. 5 shows in a block diagram an embodiment of the system according to the invention, applied to an ISDN network.

The example of FIG. 5 includes an ISDN system, as previously outlined with respect to FIG. 3. On the left side of FIG. 5, a telephone terminal 4, preferably an ISDN telephone terminal, and a data processing unit 2 are illustrated, operated by an ISDN-subscriber.

A first switching means 500 constitutes an interface between lines from the telephone terminal 4, the data processing unit 2 and the ISDN channels. Again, control means 1 are provided for controlling the assignment of communication channels to communication links. In the present example, the control means 1 consists of a first detection means 501 for receiving a request for a communication link and for receiving a termination message in case a communication link is terminated. The control means 1 further comprises second detection means 502 for determining a communication link which occupies both B-channels of the ISDN-system. The control means 1 comprises second switching means 503 for physically assigning communication channels to communication links.

Further, as shown in FIG. 5, the system comprises a second telephone terminal 5 and a second data processing unit 3. The second telephone terminal 5 may be connected to the communications system via a public land mobile network PLMN, a public switched telephone network PSTN or any other telephone network. The second data processing unit 3 may, e.g., be another computer or may constitute a gateway to a network of data processing units, as for example the Internet. Thus, the data processing unit 3 may be an Internet access server or similar. Two ISDN-B-channels are provided between the first switching means 500 and the second switching means 503. Further, a ISDN-D-channel is provided between the switching means in order to transmit control information.

In the following, the operation of the shown embodiment is described by way of an example. Only cases are considered, where the D-channel is not available for user data transmission. However, the invention may also be readily applied to cases, where the D-channel is available for user data transmission.

It is assumed, that the data processing units 2 and 3 are engaged in a data transmission session and occupy both ISDNB-channels, e.g., using a multi-link PPP-protocol. It is further assumed that the first telephone terminal 4 is called using the second telephone terminal 5. Thus the second telephone terminal 5 may issue a request for a communication link. The first detection means 501 receive the request for a communication link from the second telephone terminal 5. Obviously, a free communication channel, i.e., a free B-channel, is not available.

Accordingly, the second detection means 502 determines, whether both B-channels are occupied by the same communication link and possilby whether one of the B-channels is available for a release.

Since in this example it is assumed that both B-channels are occupied by a data transmission session between the first and second data processing units 2 and 3, the determination step will identify as target the communication link between the two data processing units.

In the following, the first and second switching means 500 and 503 will be instructed to release of one of the B-channels, and will switch the communication channel in order to establish the communication link between the two telephone terminals 4 and 5.

As a consequence, the data transmission session between the data processing units is still in progress, however, at reduced data transmission rate, since one of the occupied B-channels was released. Further, the telephone conversation between telephone terminals 4 and 5 has been established.

If now one of the telephone terminals is hung up, the first detection means 501 will receive a termination message notifying about the termination of the communication link between the first and the second telephone terminals 4 and 5. Following the switching means will initiate resuming the communication link between the two data processing units using the released B-channel, and as a result, the original state of the communication link between the data processing units is restored.

In the above example it was assumed, that the telephone conversation was initiated by telephone terminal 5. However, it is also possible, that the telephone terminal 4 is used in an attempt to establish a communication link between the two telephone terminals. In this case a request for a communication link will be transmitted from the first telephone terminal 4 to the second switching means 503 via the D-channel for transmitting control information.

It is also possible, that poll means 504 is provided in order to check in regular time intervals the status of the ISDN-B-channels in order to detect the release of the B-channel used by the telephone conversation.

It is noted, that this embodiment is not limited to ISDN, in other embodiments the invention may equally well be applied to different but similar systems. Also, a larger number of communications channels may be available and a larger number of communication devices may be provided, as outlined with respect to previous examples.

Figure 6:
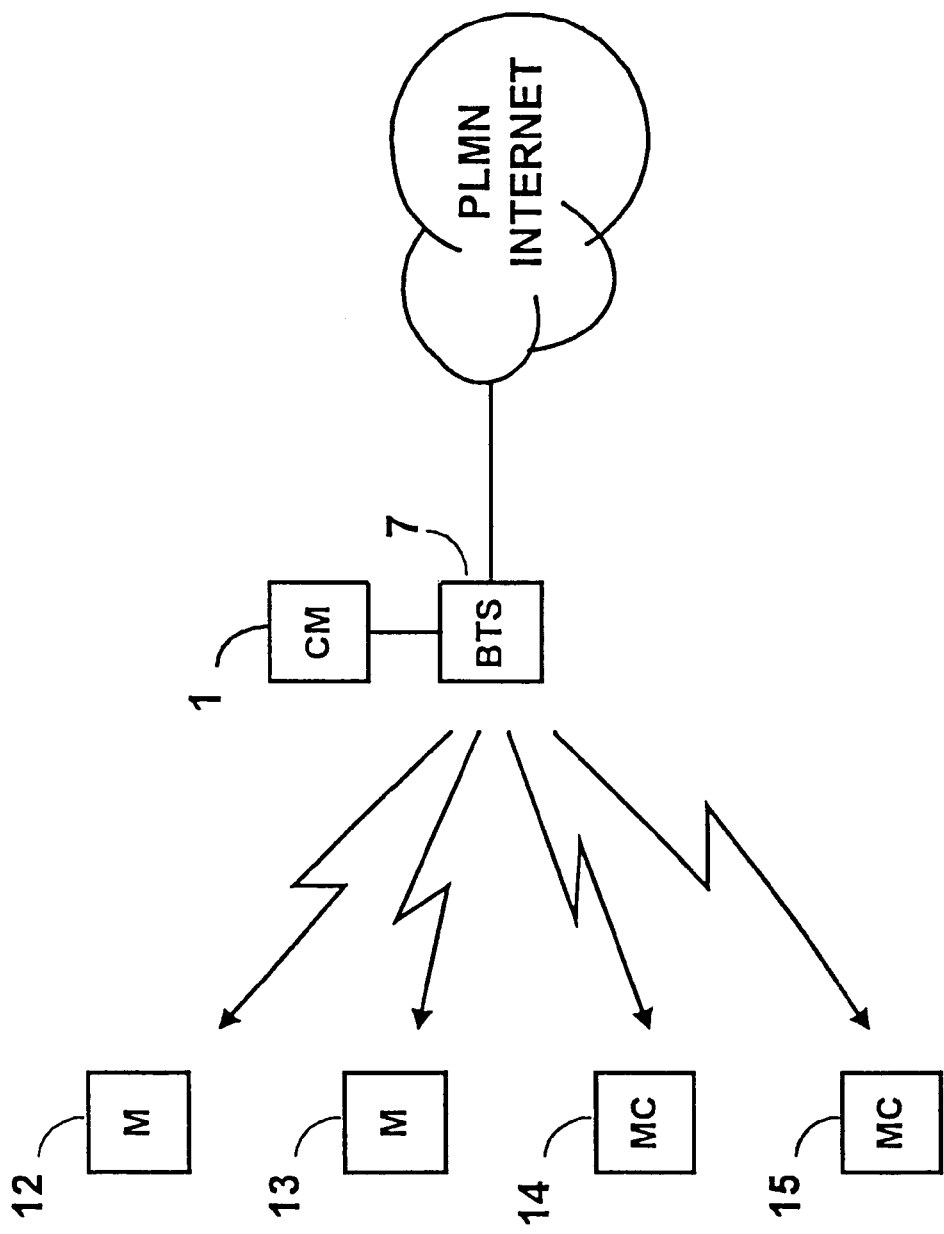
FIG. 6 shows a block diagram of yet another embodiment of the system according to the invention, applied to a mobile communication network.

FIG. 6 describes another embodiment of the present invention, involving a mobile communication network, similar to the example outlined with respect to FIG. 4. Here a base station (BTS) 7 is responsible for establishing and maintaining communication links between a large number of mobile communication units, of which mobile communication units 12, 13, 14 and 15 are shown. For explanatory reasons, in the present example it is assumed, that the first and second mobile communication units 12 and 13 are constituted by mobile telephones, and the third and fourth mobile communication units 14 and 15 are constituted by data processing units equipped with a mobile terminal. The base station 7 is connected to a public land mobile network PLMN, a public switched telephone network PSTN, an Internet or any other network. Control means 1 for controlling the communication links are connected to the base station 7.

As outlined with respect to FIG. 3, again, the communication links between the base station 7 and the mobile communication units 12, 13, 14 and 15 may occupy an arbitrary number of communication channels.

In the following, the operation of the system is described, in case a sufficient number of communication channels is not available for establishing a requested communication link.

Initially, a request for a communication link is received, either from one of the mobile communication units 12, 13, 14 and 15, from a telephone network or from a network of data processing units. Following, the control means 1 will determine whether sufficient communication channels are available for establishing the requested communication link.

For the purpose of explanation is assumed, that a sufficient number of communication channels is not available. Therefore, the control means 1 will determine at least one communication link between the base station and the mobile communication units, which occupies at least two communication channels and are available for releasing communication channels. Following, the release of a specified number of communication channels of the targeted communication links will be initiated. Again, as outlined with respect to FIG. 3, the number of to be released communication channels may be determined according to certain parameters, as for example priority, number of occupied communication channels, etc.

When an appropriate number of communication channels has been released from existing communication links, the control means 1 will initiate the establishing of the requested communication link between one of the mobile communication units and the calling party.

As outlined with respect to further embodiments, if one of the communication links is terminated, i.e., if communication channels become available, they may be used for restoring communication links which had been instructed to released a certain number of their communication channels.

What is claimed is:

1. Method of controlling communication links in a communication system, each communication link occupying at least one communication channel and being used for communications between at least two communication devices, comprising:

detecting a request for a first communication link;

establishing the requested communication link if free communication channels are available; and if free communication channels are not available:

detecting at least one second communication link occupying at least two communication channels;

releasing at least one of the communication channels of the at least one second communication link; and establishing the first communication link using the at least one released communication channel; and wherein, in case communication channels become available, these communication channels are used by the at least one second communication link until an original state thereof is reestablished.

2. Method of controlling communication links of a communication system according to claim 1, wherein, in case the first communication link is terminated, the at least one communication channel used by the first communication link is released and the at least one second communication link is resumed using the at least one released communication channel of the first communication link.

3. Method of controlling communication links of a communication system according to claim 1, wherein the communication devices communicating via the at least one second communication link are notified using control means in case the first communication link is terminated and instructed to resume the use of the at least one communication channel of the first communication link.

4. Method of controlling communication links of a communication system according to claim 1, wherein the communication devices communicating via the at least one second communication link in regular time intervals perform checks of the state of the communication channels and resume use of released communication channels until an original state of the at least one second communication link is restored.

5. Method of controlling communication links of a communication system according to claim 1, wherein a request for the first communication link is sent from a communication device to a control means, which in response thereto performs a detection of the at least one second communication link, release of the at least one communication channel, and establishing the first communication link.

6. Method of controlling communication links of a communication system according to claim 1, wherein a service record is checked and it is determined whether the at least one second communication link is available for releasing at least one of its communication channels.

7. Method of controlling communication links of a communication system according to claim 1, wherein the communication devices of the second communication link are data processing units conducting a multi-link PPP session via two ISDN-B-channels of an ISDN system (Integrated Digital Services Network).

8. Method of controlling communication links of a communication system according to claim 1, wherein the communication devices requesting the first communication link and the communication devices of the at least one second communication link include mobile communication units of a mobile communication network.

9. Method of controlling communication links in a communication system, each communication link occupying at least one communication channel and being used for communications between at least two communication devices, comprising:

detecting a request for a first communication link;
   establishing the requested communication link if free communication channels are available; and
   if free communication channels are not available:
       detecting at least one second communication link occupying at least two communication channels;
       sending a disconnect command from control means to the corresponding communication devices;
       releasing at least one of the communication channels of the at least one second communication link;
       receiving a release message from the communication devices;
       sending a release complete message from the control means to the corresponding communication devices; and
       establishing the first communication link using the at least one released communication channel; and
   wherein, in case communication channels become available, these communication channels are used by the at least one second communication link until an original state thereof is reestablished.

10. Method of controlling communication links of a communication system according to claim 9, wherein, in case the first communication link is terminated, the at least one communication channel used by the first communication link is released and the at least one second communication link is resumed using the at least one released communication channel of the first communication link.

11. Method of controlling communication links of a communication system according to claim 9, wherein the communication devices communicating via the at least one second communication link are notified using control means in case the first communication link is terminated and instructed to resume the use of the at least one communication channels of the first communication link.

12. Method of controlling communication links of a communication system according to claim 9, wherein the communication devices communicating via the at least one second communication link in regular time intervals perform checks of a state of the communication channels and resume use of released communication channels until an original state of the at least one second communication link is restored.

13. Method of controlling communication links of a communication system according to claim 9, wherein a request for the first communication link is sent from a communication device to a control means, which in response thereto performs a detection of the at least one second communication link, release of the at least one communication channel, and establishing the first communication link.

14. Method of controlling communication links of a communication system according to claim 9, wherein a service record is checked and it is determined whether the at least one second communication link is available for releasing at least one of its communication channels.

15. Method of controlling communication links of a communication system according to claim 9, wherein the communication devices of the second communication link are data processing units conducting a multi-link PPP session via two ISDN-B-channels of an ISDN system (Integrated Digital Services Network).

16. Method of controlling communication links of a communication system according to claim 9, wherein the communication devices requesting the first communication link and the communication devices of the at least one second communication link include mobile communication units of a mobile communication network.

17. Communication system, comprising:

a plurality of communication devices;
   a plurality of communication links for communications between the plurality of communication devices, each communication link occupying at least one communication channel; and
   control means including:
       first detection means for receiving a request for a first communication link and for receiving a termination message in case a communication link is terminated;
       second detection means for determining at least one second communication link occupying at least two communication channels, in case a free communication channel is not available; and
       switching means for controlling a release of at least one communication channel of the at least one second communication link, and establishing the first communication link via the released communication channel; and
       means for reestablishing, in case communication channels become available, the at least one second communication link to an original state thereof using these communication channels.

18. Communication system according to claim 17, comprising poll means connected to at least one of the communication devices of the at least one second communication link, for polling the state of communication channels in time intervals for detecting an available communication channel.

* * * * *